US 11,009,899 B2

(12) United States Patent
Shima et al.

(10) Patent No.: US 11,009,899 B2
(45) Date of Patent: May 18, 2021

(54) CIRCUIT AND CONSTANT-CURRENT DRIVE SYSTEM HAVING ADJUSTABLE CONSTANT CURRENT OUTPUT

(71) Applicant: KABUSHIKI KAISHA TOKAI-RIKA-DENKI-SEISAKUSHO, Aichi (JP)

(72) Inventors: Kengo Shima, Aichi (JP); Daisuke Aoki, Aichi (JP); Satoki Uruno, Aichi (JP); Junichi Matsubara, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/777,832

(22) PCT Filed: Aug. 23, 2016

(86) PCT No.: PCT/JP2016/074546
§ 371 (c)(1),
(2) Date: May 21, 2018

(87) PCT Pub. No.: WO2017/090286
PCT Pub. Date: Jun. 1, 2017

(65) Prior Publication Data
US 2018/0348803 A1  Dec. 6, 2018

(30) Foreign Application Priority Data

Nov. 24, 2015  (JP) .............................. JP2015-228886

(51) Int. Cl.
*G05F 1/56* (2006.01)
*G05F 3/26* (2006.01)
(Continued)

(52) U.S. Cl.
CPC ................ *G05F 1/56* (2013.01); *G05F 3/267* (2013.01); *H05B 45/10* (2020.01); *H05B 45/37* (2020.01); *H05B 45/395* (2020.01); *B60R 16/033* (2013.01)

(58) Field of Classification Search
CPC ..... G05F 1/56; G05F 3/20; G05F 3/26; G05F 3/267; H05B 33/0809; H05B 33/0845; B60R 16/033
(Continued)

(56) References Cited

U.S. PATENT DOCUMENTS

2009/0073096 A1*  3/2009  Mittal ................... H05B 45/37
345/82
2011/0018624 A1*  1/2011  Kobayashi ............. G01R 21/12
327/574
(Continued)

FOREIGN PATENT DOCUMENTS

JP   S62-231322 A   10/1987
JP   H09-307369 A   11/1997
JP   2009-118692 A   5/2009

OTHER PUBLICATIONS

International Search Report and Written Opinion issued in the corresponding application PCT/JP2016/074546 on Oct. 25, 2016.

*Primary Examiner* — Emily P Pham
(74) *Attorney, Agent, or Firm* — Roberts Calderon Safran & Cole P.C.

(57) ABSTRACT

A semiconductor integrated circuit includes a constant-voltage circuit that outputs a constant voltage and a constant-current circuit. The constant-current circuit includes a first transistor. A voltage input as an input voltage to a first gate electrode of the first transistor is equal to the node voltage at an intermediate node in a connection path between the output of the constant-voltage circuit and an external resistor. A source region of the first transistor is
(Continued)

connected to a fixed power supply, and a drain region of the first transistor is connected to the external power supply via a load. In the first transistor, a constant current can be made to flow between the source region and the drain region based on the input voltage. A constant-current drive system in which the semiconductor integrated circuit and the external resistor have been mounted on a circuit board is also constructed.

3 Claims, 4 Drawing Sheets

(51) Int. Cl.
  *H05B 45/10* (2020.01)
  *H05B 45/37* (2020.01)
  *H05B 45/395* (2020.01)
  *B60R 16/033* (2006.01)

(58) Field of Classification Search
  USPC ................................. 327/538–546; 323/315
  See application file for complete search history.

(56) References Cited

U.S. PATENT DOCUMENTS

| 2012/0044012 | A1* | 2/2012 | Shibayama | G05F 3/26 |
| | | | | 327/437 |
| 2013/0127525 | A1* | 5/2013 | Sung | G05F 3/16 |
| | | | | 327/538 |

* cited by examiner

CIRCUIT AND CONSTANT-CURRENT DRIVE SYSTEM HAVING ADJUSTABLE CONSTANT CURRENT OUTPUT

CROSS-REFERENCE TO RELATED APPLICATIONS

The present application is a U.S. National Phase of PCT/JP2016/074546 filed on Aug. 23, 2016 claiming priority to Japanese Patent Application No. 2015-228886 filed Nov. 24, 2015. The disclosure of the PCT Application is hereby incorporated by reference into the present Application.

TECHNICAL FIELD

The present invention relates to a semiconductor integrated circuit and constant-current drive system.

BACKGROUND ART

Patent Document 1 discloses a DC-DC converter. In this DC-DC converter, an output voltage from a control circuit IC is divided by a resistive divider that employs an external resistor, and the divided voltage is input to an input terminal of the control circuit IC. The output voltage of such a DC-DC converter can be easily adjusted by changing the resistance of the external resistor.

However, although output voltage can be adjusted in the above DC-DC converter, constant-current output cannot be obtained. For example, in a system in which a light-emitting diode (LED) is driven using a vehicle battery, LED brightness adjustments are achieved by adjusting the amount of current flowing to the LED. There has thus been a desire for a semiconductor integrated circuit that is capable of realizing constant-current, adjustable output, and a constant-current drive system mounted with such a semiconductor integrated circuit.

RELATED DOCUMENTS

Related Patent Documents

Patent Document 1: Japanese Patent Application Laid-Open (JP-A) No. 2009-118692

SUMMARY OF INVENTION

Technical Problem

In consideration of the above circumstances, the present invention provides a semiconductor integrated circuit that is capable of realizing a constant-current, adjustable output and a constant-current drive system mounted with such a semiconductor integrated circuit.

Solution to Problem

A semiconductor integrated circuit according to a first aspect of the present invention includes a constant-voltage circuit that outputs a constant voltage, and a constant-current circuit that includes a first transistor. The first transistor having a first gate electrode that is input with an input voltage equal to a node voltage at an intermediate node in a connection path between an output of the constant-voltage circuit and an external resistor, a first main electrode region that is connected to a fixed power supply, and a second main electrode region that is connected, through a load, to an external power supply supplying a different source of power than the fixed power supply. A constant current flows between the first main electrode region and the second main electrode region based on the input voltage input to the first gate electrode.

In the semiconductor integrated circuit according to the first aspect, the node voltage at the intermediate node between the output of the constant-voltage circuit and the external resistor is adjusted based on the resistance of the external resistor. When the node voltage is adjusted using the external resistor, an input voltage equal to the node voltage is input to the first gate electrode of the first transistor in the constant-current circuit. In the first transistor, a constant current can be made to flow between the first main electrode region and the second main electrode region based on the input voltage. Accordingly, since the current flowing to the load from the external power supply is configured by a constant current flowing to the first transistor, it is possible to realize a constant-current output that can be adjusted using the external resistor.

A semiconductor integrated circuit according to a second aspect of the present invention is the semiconductor integrated circuit according to the first aspect, wherein the constant-current circuit includes a resistor that is connected between the constant-voltage circuit and the intermediate node. Together with the external resistor, the resistor divides the constant voltage so as to generate the node voltage at the intermediate node.

In the semiconductor integrated circuit according to the second aspect, the constant-current circuit is configured including the first transistor and the resistor that configures a resistive divider with the external resistor. The node voltage at the intermediate node can be adjusted by adjusting the resistance of the external resistor. Accordingly, since the constant-current circuit is configured by two elements, the constant-current circuit can be given a simple configuration.

A semiconductor integrated circuit according to a third aspect of the present invention is the semiconductor integrated circuit according to the first aspect or the second aspect, wherein the constant-current circuit includes a second transistor. The second transistor having a second gate electrode that is connected between the first transistor and the load and that is input with the constant voltage as an input voltage, a third main electrode region that is connected to the second main electrode region, and a fourth main electrode region that is connected to the load. A constant current flows between the third main electrode region and the fourth main electrode region based on the input voltage input to the second gate electrode.

In the semiconductor integrated circuit according to the third aspect, in the constant-current circuit, the second transistor is connected between the first transistor and the load, and the constant voltage output from the constant-voltage circuit is the input voltage of the second transistor. In the second transistor, a constant current can be made to flow between the third main electrode region and the fourth main electrode region based on the input voltage input to the second gate electrode. This constant current is made an even more constant current by the first transistor, enabling variation in the constant current to be reduced.

A semiconductor integrated circuit according to a fourth aspect of the present invention is the semiconductor integrated circuit according to the third aspect, wherein the constant-current circuit includes a current mirror circuit that sets the input voltage input to the first gate electrode of the first transistor so as to be equal to the node voltage at the intermediate node.

In the semiconductor integrated circuit according to the fourth aspect, the constant-current circuit is configured including the first transistor and the current mirror circuit. The node voltage at the intermediate node can be adjusted by adjusting the external resistor. The input voltage input to the first gate electrode of the first transistor via the current mirror circuit is equal to the node voltage at the intermediate node. Thus, the constant-current circuit can be easily constructed.

A constant-current drive system according to a fifth aspect of the present invention includes a circuit board and a load. The semiconductor integrated circuit of any one of the first aspect to the fourth aspect is mounted on the circuit board, and the circuit board includes the external resistor connected to the intermediate node. The load is connected to the second main electrode region of the first transistor.

In a constant-current drive system according to the fifth aspect, the constant current flowing to the load can be adjusted by adjusting the resistance of the external resistor on the circuit board. Redesign and remanufacture of the semiconductor integrated circuit of the constant-current drive system is thus rendered unnecessary.

A constant-current drive system according to a sixth aspect of the present invention is the constant-current drive system according to the fifth aspect, wherein the load is connected to an external power supply.

The constant-current drive system according to the sixth aspect operates like, and is able to obtain the same advantageous effects as, the constant-current drive system according to the fifth aspect. In addition, in the sixth aspect, the constant-current drive system, including the external power supply, can be easily constructed.

Advantageous Effects of Invention

The present invention has the excellent advantageous effect of being able to provide a semiconductor integrated circuit that is capable of realizing a constant-current, adjustable output and a constant-current drive system mounted with such a semiconductor integrated circuit.

DESCRIPTION OF EMBODIMENTS

Explanation follows regarding a semiconductor integrated circuit and a constant-current drive system according to embodiments of the present invention, with reference to FIG. 1 to FIG. 4.

First Exemplary Embodiment

Explanation will first be given regarding a semiconductor integrated circuit and a constant-current drive system according to a first exemplary embodiment of the present invention, with reference to FIG. 1 and FIG. 2.

Circuit Configuration of Semiconductor Integrated Circuit

Figure 1:
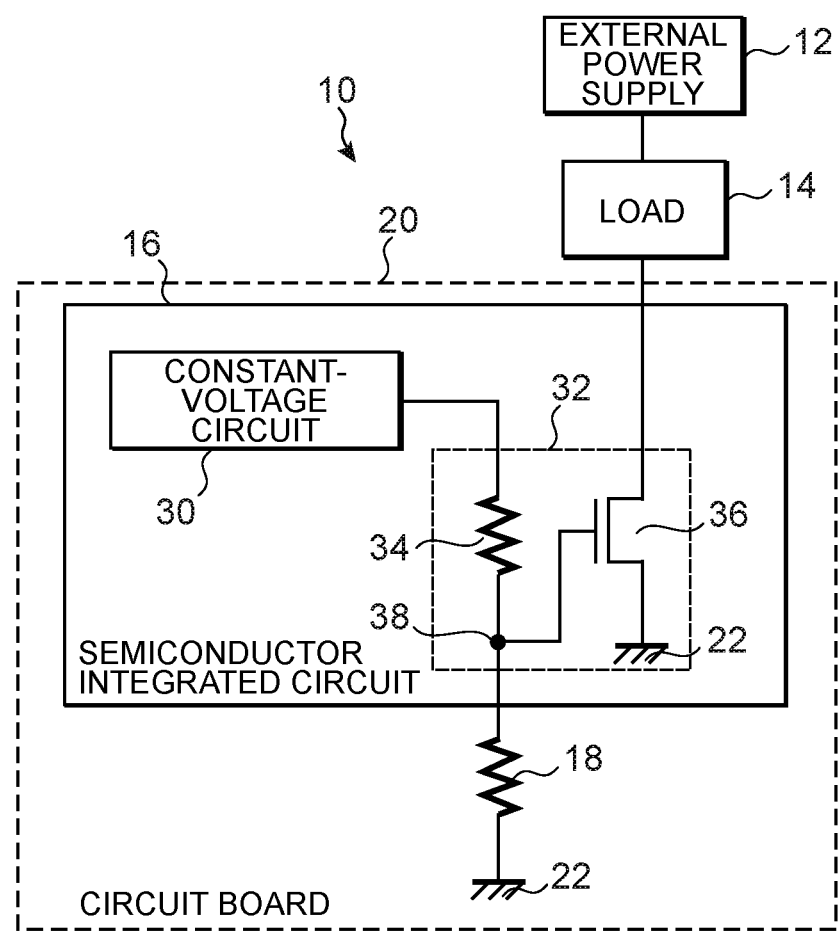
FIG. 1 is a block circuit diagram of a semiconductor integrated circuit according to a first exemplary embodiment of the present invention, and a constant-current drive system in which this circuit has been mounted on a circuit board.

As illustrated in FIG. 1, a constant-current drive system 10 according to the present exemplary embodiment includes an external power supply 12, a load 14, a semiconductor integrated circuit 16, an external resistor 18, and a circuit board 20. The semiconductor integrated circuit 16 and the external resistor 18 are mounted on the circuit board 20. Although in the present exemplary embodiment, the load 14 is external to the circuit board 20 and is not mounted on the circuit board 20, the load 14 may be mounted on the circuit board 20.

A vehicle battery is employed as the external power supply 12. The external power supply 12 is connected to one terminal of the load 14, and the external power supply 12 supplies a voltage of 12 V or 24 V, for example, to the load 14. Here, a LED is employed as the load 14. Another terminal of the load 14 is connected to the semiconductor integrated circuit 16. One terminal of the external resistor 18 is connected to the semiconductor integrated circuit 16, and the other terminal of the external resistor 18 is connected to a fixed power supply 22. The fixed power supply 22 supplies the semiconductor integrated circuit 16 with a voltage that differs from the voltage supplied from the external power supply 12. Here, this voltage is 0 V (ground).

The semiconductor integrated circuit 16 includes a constant-voltage circuit 30 and a constant-current circuit 32. The constant-voltage circuit 30 generates a constant voltage and outputs this constant voltage. The constant-current circuit 32 drives the load 14 with a constant current. This constant current can be adjusted by adjusting the resistance of the external resistor 18. To explain in more detail, the constant-current circuit 32 is configured including a resistor 34 and a first transistor 36.

One terminal of the resistor 34 is connected to the output of the constant-voltage circuit 30, and the other terminal of the resistor 34 is connected to the one terminal of the external resistor 18 via an intermediate node 38. The resistor 34 is built within the semiconductor integrated circuit 16 and is set with a constant resistance. The resistor 34 is connected in series with the external resistor 18 such that the resistor 34 and the external resistor 18 configure a resistive divider. The constant voltage output from the constant-voltage circuit 30 is divided by the resistive divider, and the divided voltage is the node voltage at the intermediate node 38. Here, the intermediate node 38 is an intermediate node in the semiconductor integrated circuit 16 in the connection path between the output of the constant-voltage circuit 30 and the external resistor 18.

In the present exemplary embodiment, the first transistor 36 is configured by an n-channel insulated gate field-effect transistor (IGFET). Examples of IGFETs include metal-oxide-semiconductor field-effect transistors (MOSFETs) and metal-insulator-semiconductor field-effect transistors (MISFETs). A first gate electrode of the first transistor 36 is connected to the intermediate node 38. The node voltage at the intermediate node 38 is applied to the first gate electrode as an input voltage. One first main electrode region of the first transistor 36 is a source region. This source region is connected to the fixed power supply 22. The other second main electrode region of the first transistor 36 is a drain region. This drain region is connected to the other terminal of the load 14. The first transistor 36 is configured such that a constant current flows between the source region and the drain region based on the input voltage input to its first gate electrode.

Operation and Advantageous Effects of the Present Exemplary Embodiment

As illustrated in FIG. 1, in the semiconductor integrated circuit 16 according to the present exemplary embodiment, the node voltage at the intermediate node 38 between the output of the constant-voltage circuit 30 and the external resistor 18 is adjusted based on the resistance of the external resistor 18. When the node voltage is adjusted using the external resistor 18, an input voltage equal to the node voltage is input to the first gate electrode of the first transistor 36 in the constant-current circuit 32.

Figure 2:
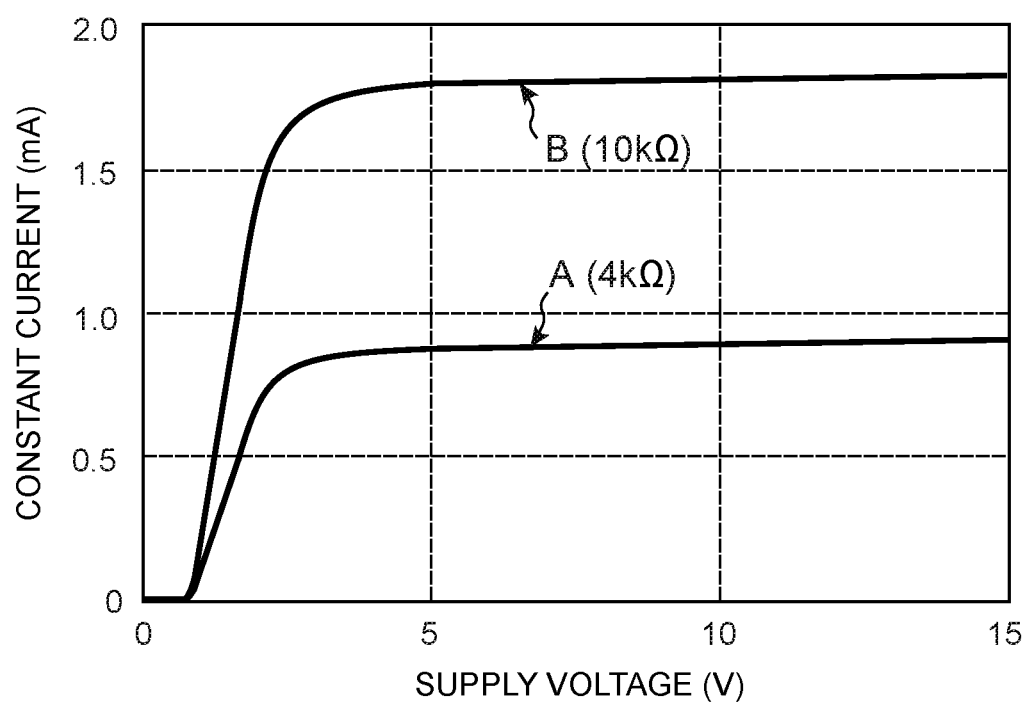
FIG. 2 is a graph illustrating input/output characteristics of a first transistor in a constant-current circuit of the semiconductor integrated circuit illustrated in FIG. 1.

FIG. 2 illustrates the input/output characteristics of the first transistor 36. The horizontal axis represents the input voltage (V) input to the first gate electrode of the first transistor 36. The vertical axis represents the current (mA) flowing between the source region and the drain region of the first transistor 36. "A" indicates voltage-current characteristics when the resistance of the external resistor 18 has been adjusted to 4 kΩ. "B" indicates voltage-current characteristics when the resistance of the external resistor 18 has been adjusted to 10 kΩ.

As illustrated in FIG. 2, the input voltage input to the first gate electrode of the first transistor 36 changes when the resistance of the external resistor 18 is changed, and based on the input voltage, a constant current can be made to flow between the source region and the drain region in the saturation region of the first transistor 36. For example, when the constant voltage output from the constant-voltage circuit 30 is 5 V and the external resistor 18 has a resistance of 4 kΩ, a constant current of 0.8 mA flows to the first transistor 36. When the constant voltage output from the constant-voltage circuit 30 is, for example, similarly set to 5 V and the resistance of the external resistor 18 is set to 10 kΩ, a constant current of 1.8 mA flows to the first transistor 36. Further, in the semiconductor integrated circuit 16 according to the present exemplary embodiment, when the constant voltage output from the constant-voltage circuit 30 is in a range of from 8 V to 15 V, a constant current accurate to within ±20% can be made to flow to the first transistor 36.

Accordingly, since the current flowing to the load 14 from the external power supply 12 is configured by a constant current flowing to the first transistor 36, it is possible to realize a constant-current output that can be adjusted using the external resistor 18. For example, in cases in which a LED is employed as the load 14, the brightness of the LED can be easily adjusted by exchanging the external resistor 18 so as to adjust the resistance (by adjusting the node voltage at the intermediate node 38).

In the semiconductor integrated circuit 16 according to the present exemplary embodiment, the constant-current circuit 32 is configured including the first transistor 36 and the resistor 34 that configures the resistive divider with the external resistor 18. The node voltage at the intermediate node 38 can be adjusted by adjusting the resistance of the external resistor 18. Accordingly, since the constant-current circuit 32 is configured by two elements, the constant-current circuit 32 can be given a simple configuration.

Moreover, in the constant-current drive system 10 according to the present exemplary embodiment, the constant current flowing to the load 14 can be adjusted by adjusting the resistance of the external resistor 18 of the circuit board 20. Accordingly, in the semiconductor integrated circuit 16 of the constant-current drive system 10, it is possible to adjust the constant current flowing to the load 14 by merely exchanging the external resistor 18, without requiring redesign and remanufacturing. In addition, the constant-current drive system 10, including the external power supply 12, can be easily constructed.

Second Exemplary Embodiment

Figure 3:
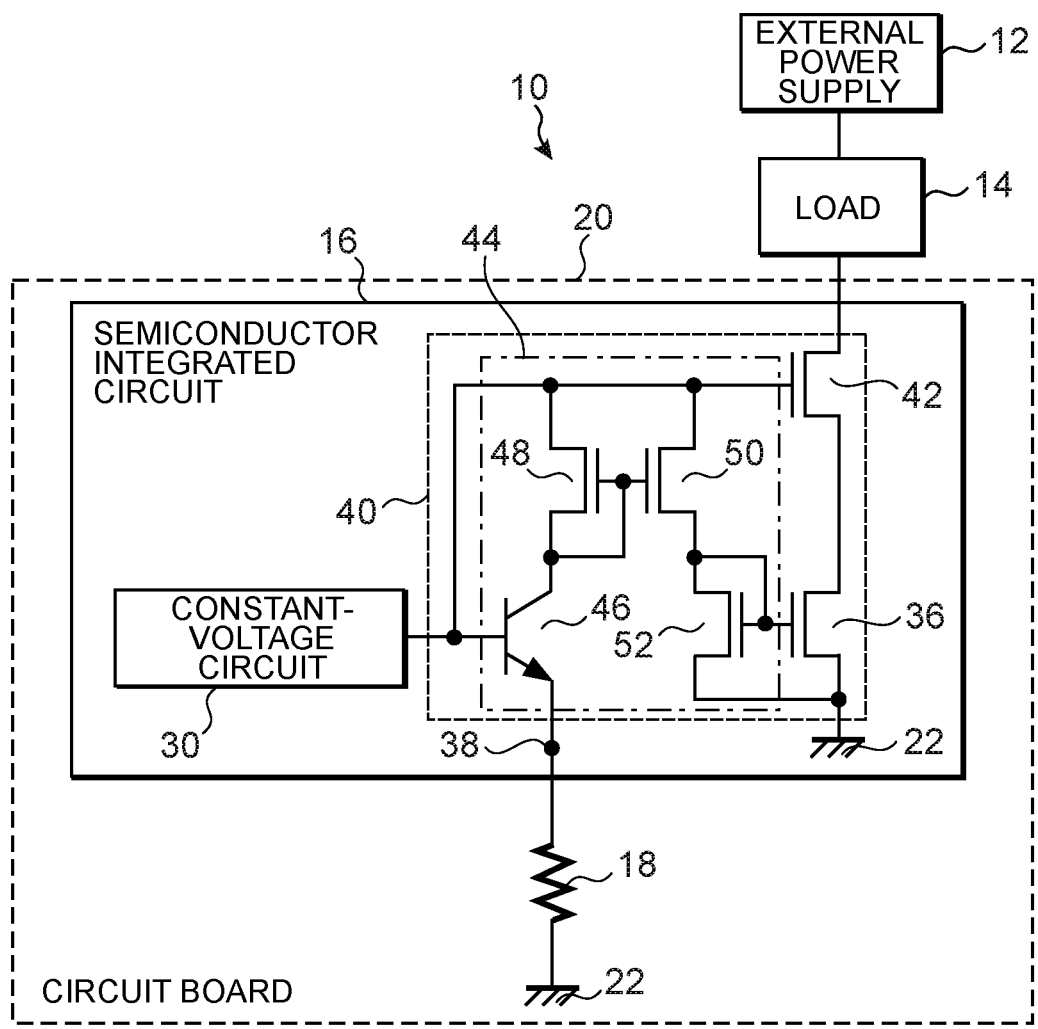
FIG. 3 is a block circuit diagram of a semiconductor integrated circuit according to a second exemplary embodiment of the present invention, and a constant-current drive system in which this circuit has been mounted on a circuit board.
Figure 4:
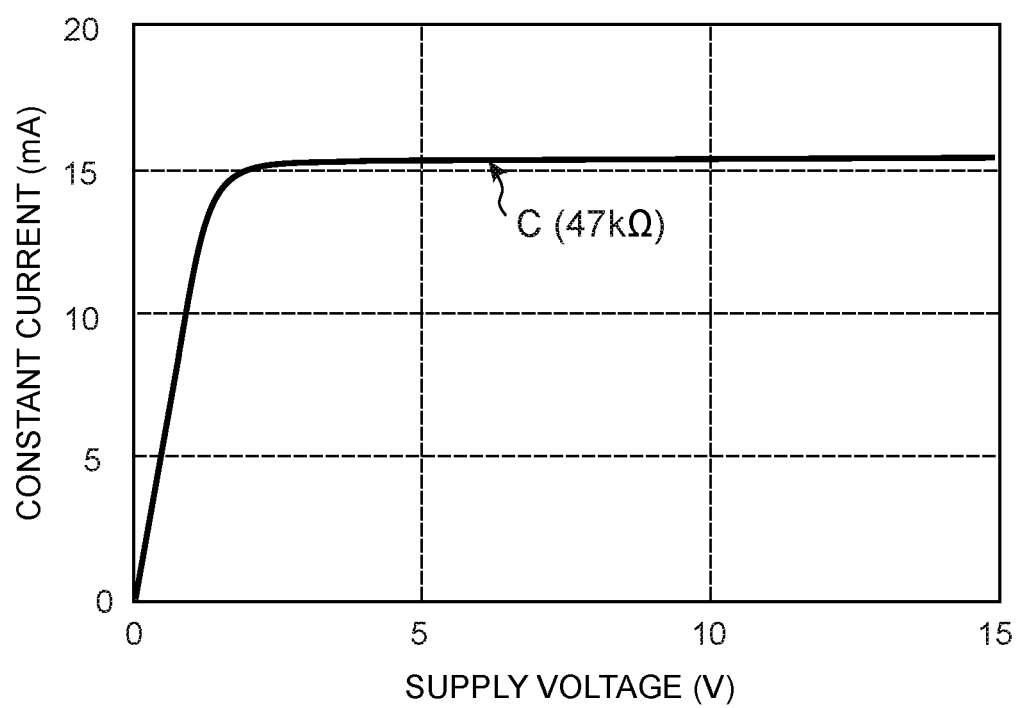
FIG. 4 is a graph illustrating input/output characteristics of a first transistor in a constant-current circuit of the semiconductor integrated circuit illustrated in FIG. 3.

Explanation follows regarding a semiconductor integrated circuit 16 and a constant-current drive system 10 according to a second exemplary embodiment of the present invention, with reference to FIG. 3 and FIG. 4. Note that in the present exemplary embodiment, configuration elements with the same or equivalent functions to configuration elements of the semiconductor integrated circuit 16 and the constant-current drive system 10 according to the first exemplary embodiment are appended with the same reference sign, and duplicate explanation is omitted.

Circuit Configuration of Semiconductor Integrated Circuit

As illustrated in FIG. 3, similarly to the constant-current drive system 10 according to the first exemplary embodiment, the constant-current drive system 10 of the present exemplary embodiment includes an external power supply 12, a load 14, a semiconductor integrated circuit 16, an external resistor 18, and a circuit board 20. In the constant-current drive system 10 according to the present exemplary embodiment, the circuit configuration of the semiconductor integrated circuit 16 mounted on the circuit board 20 differs from that in the constant-current drive system 10 according to the first exemplary embodiment.

To explain in more detail, the semiconductor integrated circuit 16 includes a constant-voltage circuit 30 and a constant-current circuit 40. The constant-current circuit 40 includes a first transistor 36, and in addition to the first transistor 36, includes a second transistor 42 that is connected between the first transistor 36 and the load 14, and includes a current mirror circuit 44.

The current mirror circuit 44 is configured including an npn bipolar transistor 46 and a p-channel IGFET 48 that together configure an input-side current path, and an n-channel IGFET 52 and a p-channel IGFET 50 that together configure an output-side current path. The base region of the bipolar transistor 46 in the input-side current path is connected to the output of the constant-voltage circuit 30. The emitter region of the bipolar transistor 46 is connected to the intermediate node 38 in the connection path between the base region (or the constant-voltage circuit 30) and the external resistor 18. The collector region of the bipolar transistor 46 is connected to the drain region and the gate electrode of the p-channel IGFET 48. The source region of the p-channel IGFET 48 is connected to the output of the constant-voltage circuit 30. The source region of the n-channel IGFET 52 in the output-side current path is connected to a fixed power supply 22. The drain region of the n-channel IGFET 52 is connected to the drain region of the p-channel IGFET 50. The gate electrode of the n-channel IGFET 52 is connected to the drain region of the n-channel IGFET 52, and is also connected to the first gate electrode of the first transistor 36. The source region of the p-channel IGFET 50 is connected to the output of the constant-voltage circuit 30, and the gate electrode of the p-channel IGFET 50 is connected to the gate electrode of the p-channel IGFET 48.

Similarly to the first transistor 36, the second transistor 42 is configured by an n-channel IGFET. The second gate electrode of the second transistor 42 is connected to the output of the constant-voltage circuit 30, such that a constant input voltage is input to the second gate electrode. One third main electrode region of the second transistor 42 is a source region. This source region is connected to the drain region of the first transistor 36. The other fourth main electrode region of the second transistor 42 is a drain region. This drain region is connected to the external power supply 12 through the load 14. In the semiconductor integrated circuit 16 according to the present exemplary embodiment, the first transistor 36 and the second transistor 42 are in a two-stage configuration connected in series between the load 14 and the fixed power supply 22.

Operation and Advantageous Effects of the Present Exemplary Embodiment

As illustrated in FIG. 3, in the semiconductor integrated circuit 16 according to the present exemplary embodiment, the node voltage at the intermediate node 38 between the output of the constant-voltage circuit 30 and the external resistor 18 is adjusted based on the resistance of the external resistor 18. When the node voltage is adjusted using the external resistor 18, an input voltage equal to the node voltage is input to the first gate electrode of the first transistor 36 in the constant-current circuit 40.

To explain in more detail, since the constant-current circuit 40 includes the current mirror circuit 44, the constant voltage output from the constant-voltage circuit 30 is first input to the base region of the bipolar transistor 46 in the current mirror circuit 44. In the bipolar transistor 46, current flows between the base and the emitter, from the base region to the emitter region. The node voltage produced at the intermediate node 38 between the emitter region and the external resistor 18 is thus equal to the output voltage of the constant-voltage circuit 30 less the threshold voltage of the pn junction diode between the base region and the emitter region. An input current corresponding this node voltage then flows from the constant-voltage circuit 30 to the fixed power supply 22, through the p-channel IGFET 48 and the bipolar transistor 46. Then, in the current mirror circuit 44, an output current that is equal to the input current from the constant-voltage circuit 30 to the fixed power supply 22 flows through the p-channel IGFET 50 and the n-channel IGFET 52. Due to this output current, the voltage input as an input voltage to the first gate electrode of the first transistor 36 is equal to the node voltage at the intermediate node 38, and a constant current can be made to flow to the first transistor 36 based on the input voltage.

Further, in the constant-current circuit 40 of the semiconductor integrated circuit 16 according to the present exemplary embodiment, the second transistor 42 is provided between the first transistor 36 and the load 14, and the constant voltage output from the constant-voltage circuit 30 is the input voltage of the second transistor 42. In the second transistor 42, a constant current can be made to flow between the source region and the drain region based on the input voltage. This constant current is made an even more constant current by the first transistor 36, enabling variation in the constant current to be reduced.

FIG. 4 illustrates the input/output characteristics of the first transistor 36. The horizontal axis represents the input voltage (V) input to the first gate electrode of the first transistor 36. The vertical axis represents the current (mA) flowing between the source region and the drain region of the first transistor 36. "C" indicates voltage-current characteristics when the resistance of the external resistor 18 has been adjusted to 47 kΩ.

As illustrated in FIG. 4, the input voltage input to the first gate electrode of the first transistor 36 changes when the resistance of the external resistor 18 is changed, and based on the input voltage, a constant current can be made to flow between the source region and the drain region in the saturation region of the first transistor 36. For example, when the constant voltage output from the constant-voltage circuit 30 is 5 V and the external resistor 18 has a resistance of 47 kΩ, a constant current of 16 mA flows to the first transistor 36. Further, in the semiconductor integrated circuit 16 according to the present exemplary embodiment, when the constant voltage output from the constant-voltage circuit 30 is in a range of from 8 V to 15 V, a constant current accurate to within ±0.1% can be made to flow to the first transistor 36.

Accordingly, since the current flowing to the load 14 from the external power supply 12 is configured by a constant current flowing to the first transistor 36, it is possible to realize constant-current output that can be adjusted using the external resistor 18, and moreover, variation in the constant-current output is able to be reduced.

Moreover, similarly to the constant-current drive system 10 according to the first exemplary embodiment, in the constant-current drive system 10 according to the present exemplary embodiment, the constant current flowing to the load 14 can be adjusted by adjusting the resistance of the external resistor 18 on the circuit board 20. Redesign and remanufacture of the semiconductor integrated circuit 16 of the constant-current drive system 10 is thus rendered unnecessary. In addition, the constant-current drive system 10, including the external power supply 12, can be easily constructed.

Supplementary Explanation of the Exemplary Embodiments

The present invention is not limited to the above exemplary embodiments, and, for example, the following modifications are possible within a range not departing from the spirit of the present invention. For example, the constant-current circuit may be configured with a two-stage configuration including a first transistor and a second transistor in the semiconductor integrated circuit according to the first exemplary embodiment of the present invention. Further, the load may be mounted on the circuit board in the constant-current drive system according to the second exemplary embodiment of the present invention.

The invention claimed is:
1. A semiconductor integrated circuit comprising:
   a constant-voltage circuit that outputs a constant voltage;
   an intermediate node in a connection path between an output of the constant-voltage circuit and one end of an external resistor, the external resistor being located outside of the semiconductor integrated circuit and having another end connected to an external fixed power supply that is located outside of the semiconductor integrated circuit;
   a current mirror circuit, directly connected to the constant-voltage circuit, in which a first input voltage changes in a case in which a node voltage at the intermediate node is adjusted based on a resistance of the external resistor; and
   a constant-current circuit that includes a first transistor having:

a first gate electrode that is input with the first input voltage, and a first main electrode region that is connected to the fixed power supply, wherein a constant current flows between the first main electrode region and a second main electrode region based on the first input voltage input to the first gate electrode; and the constant-current circuit including a second transistor having:

a second gate electrode that is input with the constant voltage as a second input voltage, a third main electrode region that is connected to the second main electrode region, and a fourth main electrode region that is connected, through a load, to an external power supply supplying a different source of power than the fixed power supply, wherein a constant current flows between the third main electrode region and the fourth main electrode region based on the second input voltage input to the second gate electrode, wherein the load is connected between the external power source and the semiconductor integrated circuit such that the power source drives the load with constant current, the amount of current being controlled by the resistance of the external resistor.

2. The semiconductor integrated circuit of claim 1, wherein:

the current mirror circuit includes an input-side current path having a third transistor and a bipolar transistor, and an output-side current path having a fourth transistor and a fifth transistor;

in the third transistor, a fifth main electrode region is connected to the constant voltage, a sixth main electrode region is connected to a collector region of the bipolar transistor, and a third gate electrode is connected to a fourth gate electrode of the fourth transistor;

in the bipolar transistor, a base region is connected to the constant voltage, and an emitter region is connected to the intermediate node;

in the fourth transistor, a seventh main electrode region is connected to the constant voltage, and an eighth main electrode region is connected to the first gate electrode and a ninth electrode region of the fifth transistor and a fifth gate electrode of the fifth transistor, and in the fifth transistor, a tenth main electrode region is connected to the fixed power supply.

3. The semiconductor integrated circuit of claim 1, wherein the amount of current is controlled by an amount that the constant voltage is divided by the external resistor.

* * * * *